United States Patent
McCormick

(10) Patent No.: US 11,905,481 B2
(45) Date of Patent: Feb. 20, 2024

(54) FIRE TINDER, USAGE, AND APPARATUS AND PROCESS FOR MANUFACTURING

(71) Applicant: Eric M McCormick, Fort Jones, CA (US)

(72) Inventor: Eric M McCormick, Fort Jones, CA (US)

( * ) Notice: Subject to any disclaimer, the term of this patent is extended or adjusted under 35 U.S.C. 154(b) by 0 days.

(21) Appl. No.: 17/680,276

(22) Filed: Feb. 24, 2022

(65) Prior Publication Data

US 2022/0267690 A1   Aug. 25, 2022

Related U.S. Application Data

(60) Provisional application No. 63/152,846, filed on Feb. 24, 2021.

(51) Int. Cl.
  *C10L 5/36* (2006.01)
  *C10L 5/14* (2006.01)
  *F23Q 2/18* (2006.01)

(52) U.S. Cl.
  CPC ............. *C10L 5/36* (2013.01); *C10L 5/146* (2013.01); *F23Q 2/18* (2013.01); *C10L 2230/06* (2013.01)

(58) Field of Classification Search
  CPC .................................... C10L 5/36; F23Q 2/18
  See application file for complete search history.

(56) References Cited

U.S. PATENT DOCUMENTS

| | | | |
|---|---|---|---|
| 1,747,919 A | * | 2/1930 | Welton ............. C10L 5/36 100/903 |
| 4,179,270 A | | 12/1979 | Clayton et al. |
| 9,127,840 B2 | | 9/2015 | Fandrich |
| 10,544,379 B2 | | 1/2020 | Fandrich et al. |
| D904,116 S | | 12/2020 | McCormick |
| 2014/0283440 A1 | | 9/2014 | Beadles |
| 2019/0127653 A1 | | 5/2019 | Brender |

OTHER PUBLICATIONS

Screen captures from Kickstarter page entitled "FireAnt—Accessorize your Swiss Army Knife with Fire" 37 pages, uploaded on Mar. 3, 2020 by user "Tortoise Gear". Retrieved from Internet: <https://www.kickstarter.com/projects/fireant/fireant-accessorize-your-swiss-army-knife-with-fire>. (Year: 2020).*
Screen capture from YouTube video clip entitled "Hand Drill, Paint Stir Stick, Wood Shavings Tinder Bundle," 1 page, uploaded on Jul. 24, 2019 by user "David West". Retrieved from Internet: <https://www.youtube.com/watch?v=W2P_zaLG4Lk>. (Year: 2019).*
Webpage entitled "Gear talk: Firefly—asimple addition to your kit" 3 pages, uploaded on Oct. 13, 2018 by "Three Points of the Compass". Retrieved from Internet: <https://threepointsofthecompass.com/2018/10/13/firefly-a-simple-addition-to-your-kit/>. (Year: 2018).*

(Continued)

*Primary Examiner* — Ellen M McAvoy
*Assistant Examiner* — Ming Cheung Po

(57) ABSTRACT

Helix shaped fire tinder, and fire tinder integration into a corkscrew to provide an easy secure carrying and readily available storage solution for the user. An apparatus for manufacturing a helix shaped fire tinder. A process including a means of making a fully waterproof helix shaped tinder.

9 Claims, 8 Drawing Sheets

(56) References Cited

OTHER PUBLICATIONS

Screen capture from Youtube video clip entitled "Cotton vs Zippo Tinder Sticks" uploaded on Jul. 27, 2013 by user "TheReviewersTV". Shows a wax saturated fire starting tinder. Retrieved from internet: https://www.youtube.com/watch?v=zzmGXuJ8Lil.

Screen capture from Youtube video clip entitled "Coghlans Emergency Tinder Burn Test & Review" uploaded on May 4, 2017 by user "Heath Schroeder". Shows a wax or paraffin saturated fire starting tinder. Retrieved from internet: https://www.youtube.com/watch?v=KARvTiHvrn0.

Screen capture from Youtube video clip entitled "Absolute Best Firestarters On Earth! | 2018" uploaded on Oct. 19, 2018 by user "DropForgedSurvival". Shows various selection of fire starting tinders on the market with a list of their names. Retrieved from internet: https://www.youtube.com/watch?v=-ksCCe5KJLU.

\* cited by examiner

FIRE TINDER, USAGE, AND APPARATUS AND PROCESS FOR MANUFACTURING

CROSS-REFERENCE TO RELATED APPLICATIONS

This application claims priority to U.S. Provisional Application "Helix Shaped Fire Starting Tinder and Process for Manufacturing", with Ser. No. 63/152,846 and filing date of Feb. 24, 2021. This application is also related to U.S. Design Pat. No. D904,116S, entitled "Fire Starter", and filed on Jul. 14, 2019. Both of these applications are hereby incorporated by reference in their entireties.

FIELD

The present disclosure includes fire tinder, a process of storing, and a process and apparatus for manufacturing. Some particular embodiments related to shaped fire tinder configured to be integrated within a tool with a helix-shaped member.

BACKGROUND

Making a sustainable fire is not always easy. Traditionally a fire is started by placing fine dry tinder and other small easily ignited material below larger wood or longer-burning fuel materials that are more difficult to light. The tinder is ignited by a spark or small flame and burns long enough to light the successively larger and harder to light fuels to build a sustaining fire. The success of this system is heavily dependent upon securing good tinder that will easily ignite to flame to start the process of igniting successively larger fuels. There are many factors that can make it difficult to obtain and use tinder that will easily light and make fire.

In many areas and terrains, it is difficult to actually find tinder that is dry or easy to light as it is scarce or may not be available. Weather conditions can play a large role in reducing the effectiveness of tinder that is available. Rain, snow, wind, ice, and humidity all make most readily available tinder much more difficult to light and use effectively for fire starting. Furthermore, an inexperienced individual may lack the required skill to find and use natural tinder especially in less than ideal conditions.

Individuals, possibly without even realizing it, can be discouraged from carrying their own alternative easy to light tinder. Many alternatives require packaging or waterproof cases surrounding them which add unnecessary bulk or result in too many items for what can be conveniently packed and carried, especially if only pocket space is available. Alternative pre-made fire tinder products are often bulky, toxic and/or not waterproof at all, or not actually completely waterproof as claimed. These alternatives often fail after prolonged exposure to moisture or damage to their protective cases or packaging. These factors discourage individuals from bringing fire lighting tinder with them whenever they venture into the great outdoors.

There is a need for reliable, non-toxic, fully waterproof fire tinder that is easy and convenient to carry and use for even the inexperienced user or minimalist.

SUMMARY

The present disclosure includes various embodiments of a reliable fire tinder with a helix shape and integration of fire tinder with a host tool. A fire tinder according to one embodiment comprises; a flammable fiber, wax material, and a helix shaped form.

The present disclosure also includes, according to some embodiments, a process and apparatus for making waterproof and non-toxic helix shaped fire tinder. In some embodiments, an exemplary apparatus for fire tinder making includes a heating container, a helix-shaping tool, and a cooling mechanism. In some embodiments, an exemplary process includes the steps of; providing a flammable fiber and a wax based solution; saturating the flammable fiber with the melted wax based solution; compressing the resulting waxed flammable fiber into a helix shaped cavity; cooling the waxed flammable fiber within the helix shaped cavity; removing the resulting helix shaped waxed fiber from the cavity; and trimming the resulting removed helix shaped waxed fiber to a desired length.

The present disclosure also includes an exemplary method of storing helix shaped fire. The method, in accordance with some embodiments, including the steps of; providing fire tinder; providing a tool that is helix-shaped; and integrating the helix shaped fire tinder within the helix-shaped tool.

Features and advantages of embodiments will become readily apparent from the following detailed description, the accompanying drawings, and the appended claims.

BRIEF DESCRIPTION OF DRAWINGS

Drawings—Figures

DETAILED DESCRIPTION OF EXEMPLARY EMBODIMENTS

The embodiments and processes disclosed below are not intended to be exhaustive or limit the disclosure to the precise forms disclosed in the following detailed description. Rather, the embodiments and processes are merely examples. They are chosen and described so that others skilled in the art may utilize their teachings. It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

This document refers to various embodiments of fire tinders which comprise a body defining a shape that is at least a partial helix. Because the aspects of; fire tinder; its body; and the shape defined by the body, encompass one and the same object, different reference numbers will be used to point to the same object in some illustrations, but will refer to different aspects (fire tinder, body, and shape) of the object in the description. It should also be understood that in the disclosure and appended claims the term "helix-shaped tool" includes any type of tool that has a helix shape, such as a corkscrew for example a corkscrew on a keychain, and also includes any helix-shaped member of a tool, the helix-shaped member being for example, a corkscrew of a pocket knife, wine opener, or multi-tool.

Figure 1A:
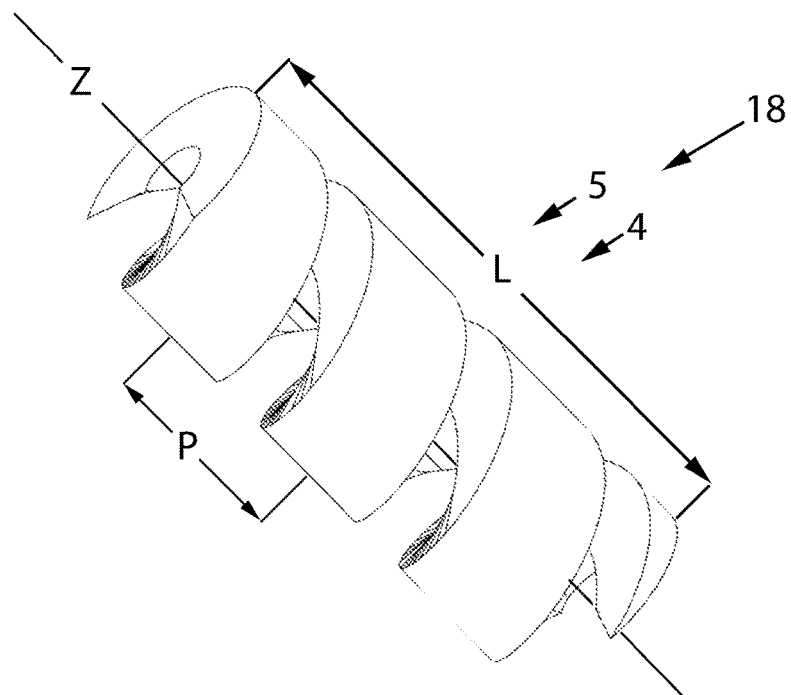
FIGS. 1A to 1C illustrate a fire tinder, consistent with some embodiments. Several views are shown, including:
  1A is an isometric perspective view thereof;
  1B is a side view thereof;
  1C is an end view thereof.
Figure 1B:
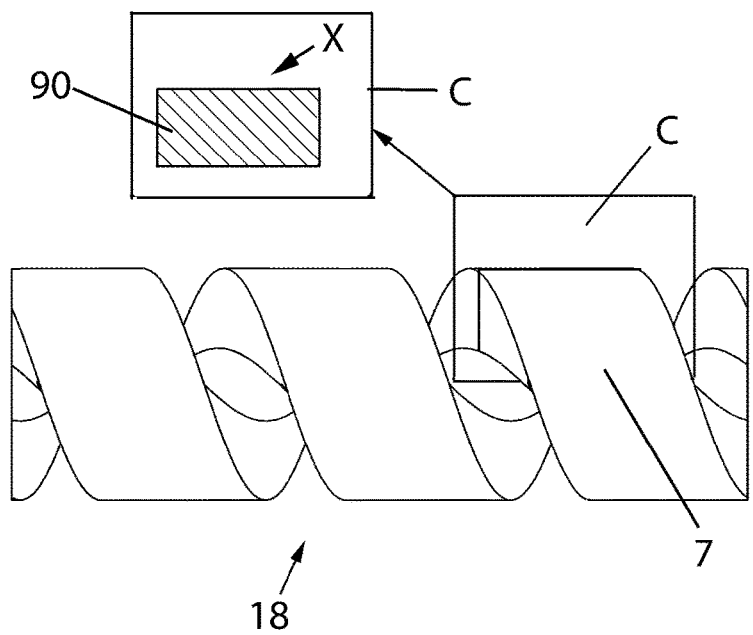
Figure 1C:
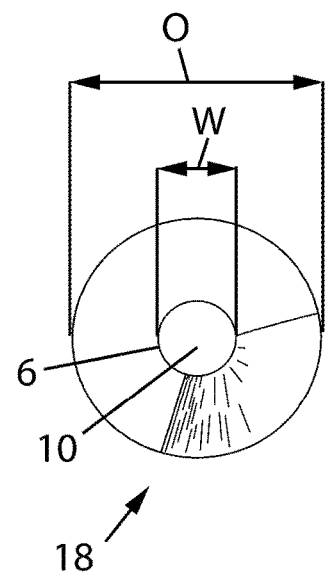

An exemplary embodiment of a fire tinder 18 with a body 4 at least a partially helix shape 5 is presented with reference to FIGS. 1A-1D. Consistent with some embodiments, the fire tinder has an at least partially helix shape 5. The at least partially helix shape 5 includes a helix pitch P, which in some embodiments is between 3 mm and 20 mm. The helix pitch P is measured as a length of one complete helix turn, measured along an axis Z. The at least partially helix shape 5 includes an overall length L, in some embodiments being between about 3 mm-50 mm. The at least partially helix shape 5 includes an outer width O, which in some embodiments is between 5 mm and 10 mm, and an inner width W, which in some embodiments is between 1 mm and 5 mm. The inner width W is measured across an opening 6 of a center hole 10, consistent with some embodiments, which is defined by the at least partially helix shape 5. Consistent with some embodiments the defined center hole 10 runs down the overall length L of the embodiment and allows for integration of a sparking tool into the center hole 10. The center hole 10 and also allows for increased air flow and surface area for improved burning characteristics. The at least partially helix shape 5 also includes a cross-sectional-plane-profile-shape X, which in some embodiments could be a complex shape or at least square, rectangular (as shown in FIG. 1B), trapezoidal, triangular, or circular. The cross-sectional plane profile shape X is measured from one helix turn 7 and defined by the profile of the shape of the helix turn 7 crossing through a defining cross-sectional plane C. The defining cross-sectional plane C is aligned with the axis Z and extents in a radial direction from it. Consistent with some embodiments the cross-sectional plane profile shape X, is shaped in such a way as to attempt to fill the empty space as much as possible within and/or surrounding a helix-shaped tool or helix shaped tool member. The at least partially helix shape 5 in some embodiments is comprised of about 15-50% cotton fibers and about 50-85% paraffin wax by weight. The at least partially helix shape (REF #) of the exemplary fire tinder 18 shown is completely singular helix shaped and is designed to allow for improved burning characteristics and fitment into a pocket knife corkscrew 14 shown in FIG. 1D. In some particular embodiments of the example fire tinder 18 the helix pitch P is about 7 mm, the overall length L is about 25 mm, the outer width O is about 7 mm, and the inner width W is about 3 mm. The about 7 mm outer width O of the fire tinder 18 is sized to be approximately the same as the outer diameter of the corkscrew 14 in FIG. 1D in which it was designed to fit so it doesn't impede corkscrew 14 closing or protrude from the corkscrew 14. The cotton fibers hidden within the composition of the fire tinder 18 are impregnated and surrounded by paraffin wax, making the fire tinder 18 completely waterproof and self-enclosed. Consistent with some particular embodiments, the fire tinder 18 is comprised of about 20% cotton fibers and about 80% paraffin wax by weight. The cross-sectional-plane-profile-shape X of the fire tinder 18 is a rectangular-cross-sectional-plane-profile-shape 90 to help more fully fill the space surrounding the corkscrew 14 in which the fire tinder 18 is designed to fill as compared to a rounded profile shape, allowing more volume of tinder to be carried, this concept will be discussed further in a later section.

Example Operation and Storage Method

Figure 1D:
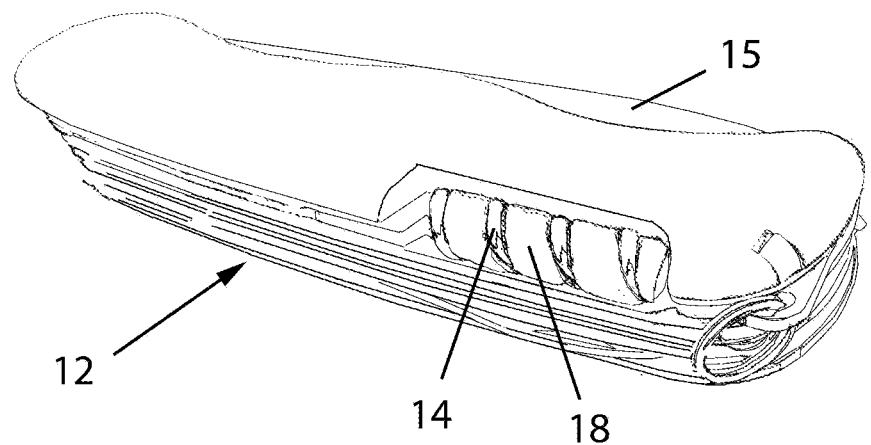
FIG. 1D illustrates the embodiment of FIGS. 1A to 1C as it integrates with a host tool corkscrew.
Figure 1E:
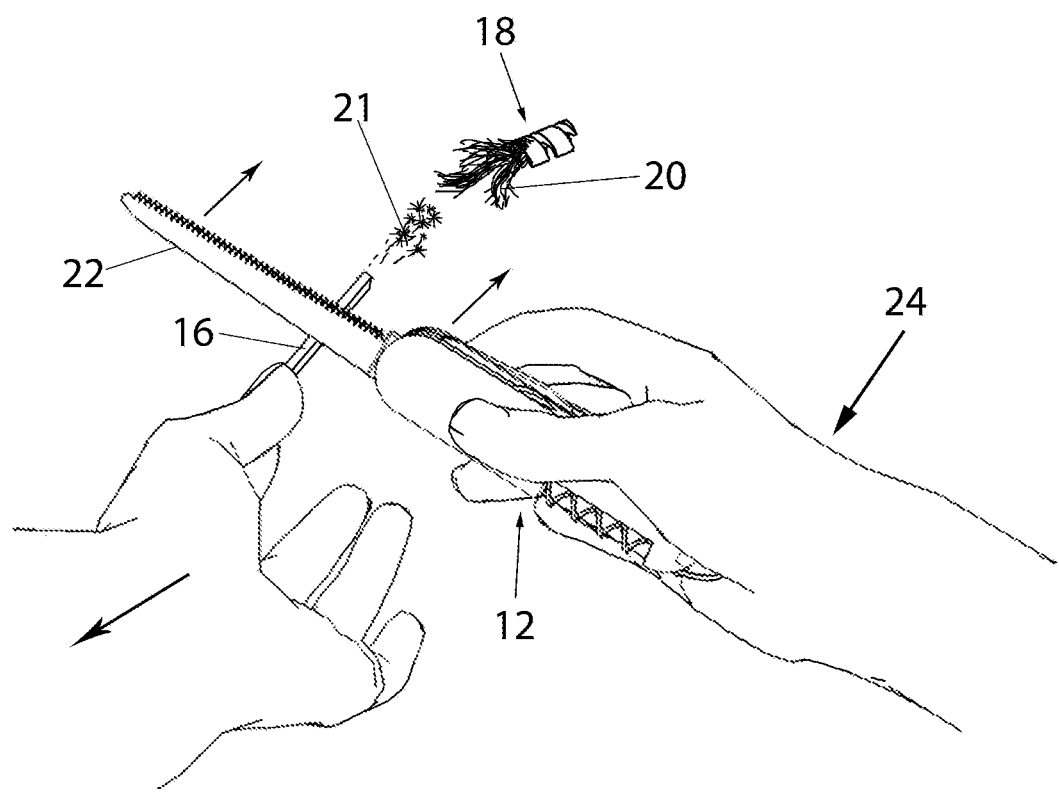
FIG. 1E illustrates a suggested method of use showing the embodiment of FIG. 1A to 1C partially pulled apart along with a host knife and sparking tool.

To describe an example of operation the afore mentioned embodiment is illustrated in FIG. 1D and FIG. 1E along with an example host pocket knife 12 and an example sparking steel 16 to help the reader understand an intended integration and operation with a host tool. The example pocket knife 12 and sparking steel 16 depicted in FIGS. 1D and 1E are for examples only and are not intended to be limiting. Referring to these figures, the fire tinder 18 is twisted into the corkscrew 14 in the pocket knife 12, integrating for easy, secure and readily available carrying and storage. When needed for starting fire, the fire tinder 18 is removed from the corkscrew 14 and pulled apart to expose small wax impregnated flammable fibers 20 within the fire tinder 18. These flammable fibers 20 are then ignited to flame with sparks 21 directed into the flammable fibers 20, the sparks 21 created by striking together in opposing directions the sparking steel 16 (in this example being a rectangular pyrophoric rod) and a scraping tool member 22 (in this example being the back spine of a saw blade) of the pocket knife 12 in order to assist a fire starting individual 24 to build a sustainable fire. The fire starting individual 24 may choose to use all or part of the fire tinder 18 for each fire and place any remainder back into the corkscrew 14 for future use. Integration with a host tool may also provide the added benefit that the fire tinder 18 may be easily divided for multiple uses with a cutting tool member of the host tool, being for example, a knife blade 15 of the example pocket knife 12.

Figure 6:
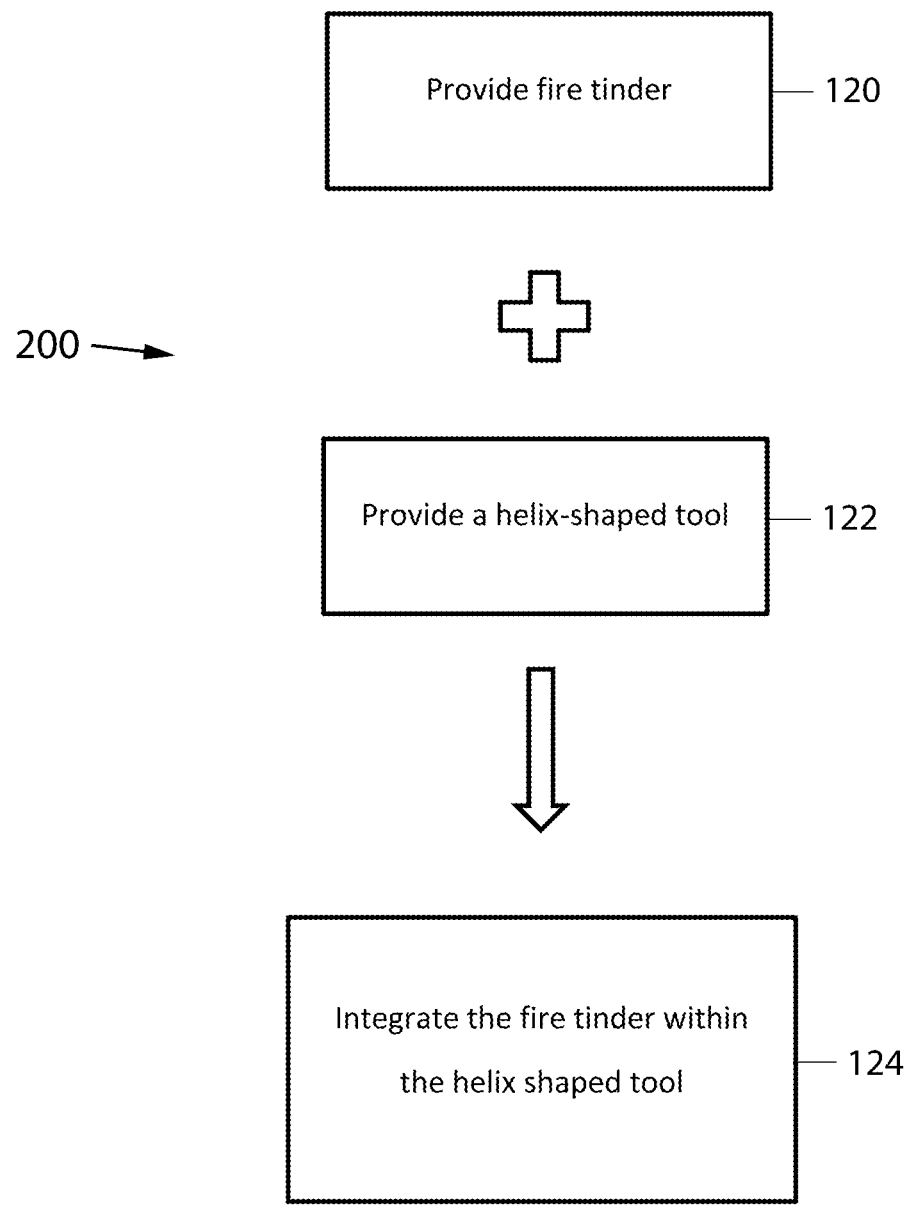
FIG. 6 illustrates a flow chart with steps for one described method of fire tinder storage.

For reference an exemplary method 200 of fire tinder storage, consistent with some embodiments, is shown in a flow diagram in FIG. 6 and includes the steps of: step 1 120, providing fire tinder; step 2 122, providing a helix shaped tool; and step 3 124, integrating the fire tinder within the helix shaped tool.

Figure 1F:
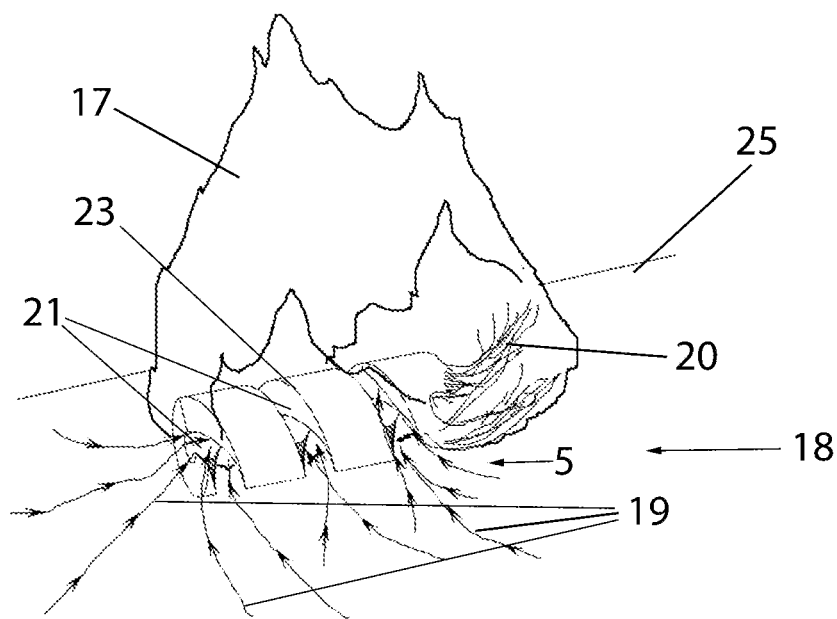
FIG. 1F illustrates air flow around the embodiment of FIG. 1A to 1C while actively burning.

The afore mentioned embodiment is also shown in FIG. 1F, actively burning with flames 17 on a surface 25 to illustrate how the at least partially helix shape 5 can provide increased air flow 19 to improve the burning characteristics of the fire tinder 18. The helix shape provides a large surface area over the fire tinder 18 and defines voids 21 for air flow 19 to occur easily around, through and under the fire tinder 18 as it burns. Once the exposed flammable fibers 20 in the tinder are lit, increased air flow 19 helps to carry more oxygen to the fire tinder 18, aiding in full and even combustion which can create a steady and reliable flame 17 and leaves little to no un-combusted material wasted at the end of the burn. The complexity of the at least partially helix shape 5 and its sharp angles 23 can also allow for more resilient burning during windy conditions as the flames 17 can burn on surfaces with differing angles to the wind and in between the helix coils and defined voids 21 creating areas where remnant flame can stay protected from being blown out by direct wind.

Further Embodiments and Usage

Figure 2:
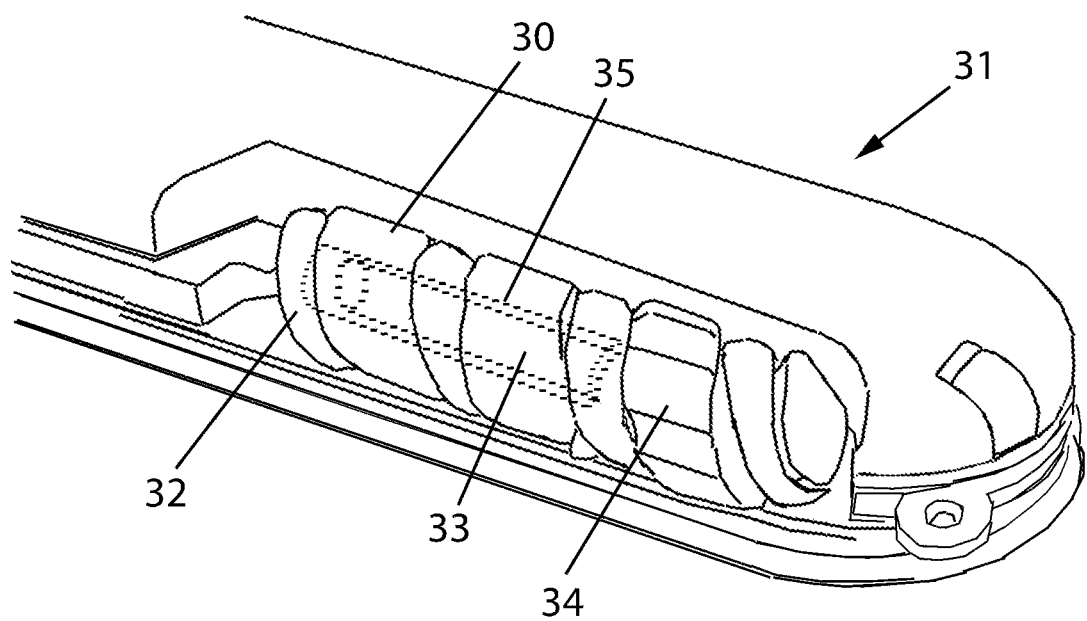
FIG. 2 illustrates another embodiment as it integrates with a host tool corkscrew and a cork screw sparking tool.

FIG. 2 illustrates how a second fire tinder embodiment 30 defining an overall length that is shorter relative to an example host tool corkscrew 32 can be integrated with a corkscrew sparking tool 34 into the example host tool corkscrew 32 (an example of a helix-shaped tool member), both twisting into and nesting inside and contained together within the corkscrew 32 of a host tool 31 (an example of a tool with a helix-shaped tool member). A pyrophoric sparking rod 33 (hidden when contained but illustrated in broken lines) of the corkscrew sparking tool 34 is nested inside a center hole 35 (also hidden but illustrated in broken lines) of the second fire tinder embodiment 30. The corkscrew sparking tool 34 can be used in the same way as the sparking steel 16 of FIG. 1E to generate the necessary sparks to ignite the paired second fire tinder embodiment 30. This arrangement allows a user to carry a complete multi-use and waterproof fire starting system within the corkscrew of their pocket tool. This easily stored and rapidly deployable system utilizes empty space which creates no extra pocket bulk, adds no additional loose items that may be forgotten or that clank around in the pocket, and adds almost no carry weight.

Figure 3A:
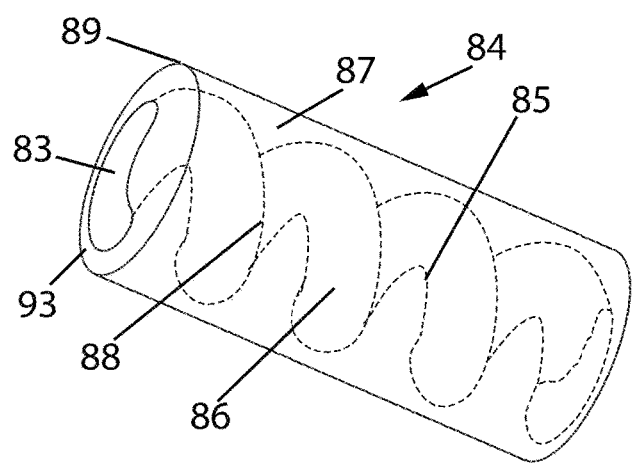
FIG. 3A illustrates an isometric perspective view of a third embodiment consistent with some embodiments defining a helix shaped cavity internally.
Figure 3B:
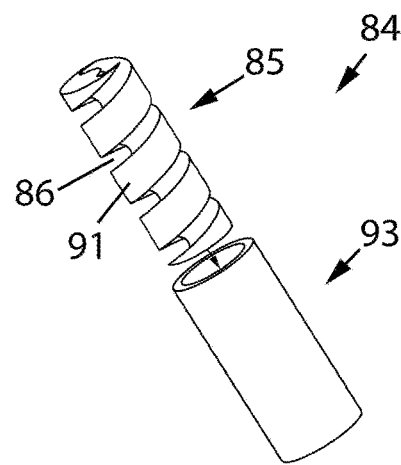
FIG. 3B illustrates an exploded view of the embodiment of FIG. 3A.

According to some embodiments, an at least partially helix shaped fire tinder can be formed with body features externally on and/or internally in the body. Body features can also be used to define a helix shaped cavity on the inside or the outside of an at least partially helix shape. The following describes different aspects of the shape of an exemplary fire tinder and should not be confused with describing parts that are separate or that are separable. FIG. 3A presents a third fire tinder embodiment 84 of an at least partially helix shaped tinder, consistent with some embodiments that are not fully helix shaped but rather partially helix shaped. A helical aspect 85 of the third fire tinder embodiment 84 is on the inside of the embodiment and not visible externally. The outside shape 89 of the embodiment is cylindrical. The helical aspect 85 on the inside of the embodiment is shaped and sized to define a helix shaped cavity 86 that a helix-shaped tool can be integrated into by twisting the tool into the defined helix shaped cavity 86. The helix shaped cavity 86 is defined by an opening 83 on either end of the third fire tinder embodiment 84 and extending through the length of the embodiment following a helical path 88 created by the helical aspect 85 on the inside of the embodiment. FIG. 3B, showing an exploded view of the embodiment of FIG. 3A, is presented to help visualize the helical aspect 85 of the third fire tinder embodiment 84. FIG. 3B is shown for clarity of understanding of the shape of the embodiment only and does not represent that the embodiment is designed in two pieces or to come apart. It should be very clearly understood that the entire embodiment is designed as one piece of the same material composition and that aspects of the shape of the body 87 are shown separately in FIG. 3B only to help the reader visualize the helical aspect 85 within that is otherwise hidden inside the embodiment. When a non-helical shaped outer volume 93 is shown taken away from the helical aspect 85 a helical shape 91 of the helical aspect 85 of the embodiment can be clearly seen. The embodiment is designed to integrate with a helix-shaped tool that has ample room around it to accommodate the additional fire tinder outer volume 93 that would extend around the outside diameter of the helix-shaped tool when integrated. This embodiment lacks a center hole and the overall goal of its design shape is to maximally fill the available space within and the available space surrounding the host helix-shaped tool.

According to some embodiments, one design goal when designing a fire tinder for integration with a helix-shaped tool is to design the fire tinder so that it can maximally fill the space available to provide as much fire tinder volume as possible for fire lighting. For this reason an optimal cross-sectional-plane-profile-shape X is important to consider in the design. In many helix shaped tool members there is little to no space around some sides of the outside dimensions of its helix shape as it is closed into its parent tool. Generally the space afforded for fire tinder to integrate with a helix shaped tool is inside the body of the tool, being in the center of the helix turns and in between the helix turns and not extending too far past its outer dimensions.

Figure 4:
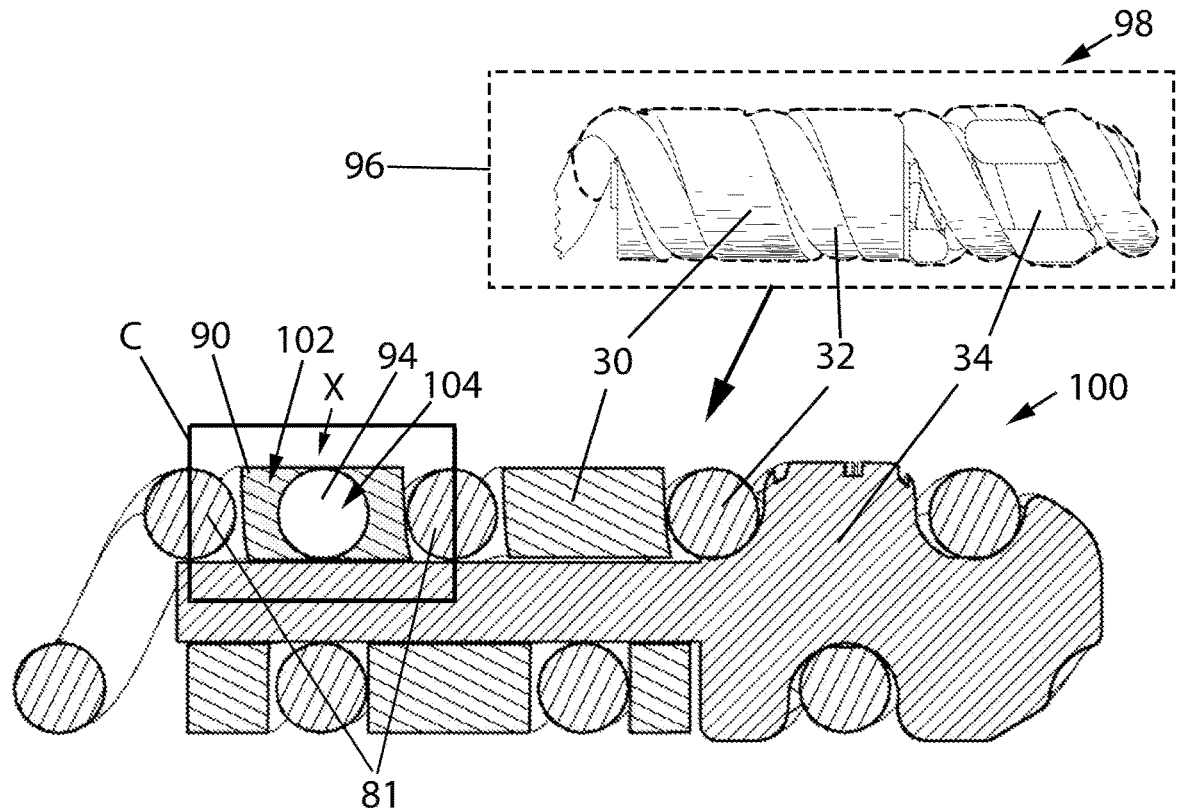
FIG. 4 illustrates a cross-sectional view of the embodiment of FIG. 2 as it integrates with the host tool corkscrew and the cork screw sparking tool of FIG. 2.

With references to FIG. 1B, FIG. 1C, FIG. 2 and FIG. 4, the following describes further how a space defined by a helix-shaped tool relates to the significance of the cross-sectional-plane-profile-shape X of various fire tinder embodiments. FIG. 4 shows a three-dimensional un-cross-sectioned representation 98 of the components of; the corkscrew 32 (shown without its host tool 31 for clarity), the corkscrew sparking tool 34, and the second fire tinder embodiment 30 of FIG. 2 as they are nested together, and a dividing cross-sectional plane 96 is shown through them to illustrate its dissecting orientation to them in relation to a magnified cross-sectional representation 100 shown below the un-cross-sectioned representation 98. In the cross-sectional representation 100 the cross-section of each of the components crossing the cross-sectional plane 96 can be seen as they relate to each other. In the magnified cross-sectional representation 100 the defining cross-sectional plane C area is shown with the rectangular-cross-sectional-plane-profile-shape 90 and covers just one helix turn of the second fire tinder embodiment 30. A circular-cross-sectional-plane-profile-shape 94 is shown superimposed on top of the rectangular-cross-sectional-plane-profile-shape 90 in the defining cross-sectional plane C. The hashed area 102 of the rectangular-cross-sectional-plane-profile-shape 90 visibly fills far more of the area between the corkscrew turns 81 and the corkscrew sparking tool 34 than a circular area 104 of the superimposed circular-cross-sectional-plane-profile-shape 94. It can be seen from this description that the rectangular-cross-sectional-plane-profile-shape 90 helps to more fully fill the available space defined inside a common helix-shaped tool, in this example being the corkscrew 32, than a circular-cross-sectional-plane-profile-shape 94 having the same outer width O. It is to be understood that a cross-sectional-plane-profile-shape that is rectangular or square, or that deviates slightly from a rectangular or square shape should be considered rectangular. Deviations allowing for variances of slightly rounded corners, corner angles within 15% of a 90 degree angle, or lines deviating within 20% away from straight. This description of profile shapes is included not to be limiting of any of the shapes afforded under the disclosure and appended claims, but to help further describe features of exemplary embodiments. In particular, a circular cross-sectional shape is not disclaimed.

Fire Tinder Manufacturing Apparatus and Process

Figure 5:
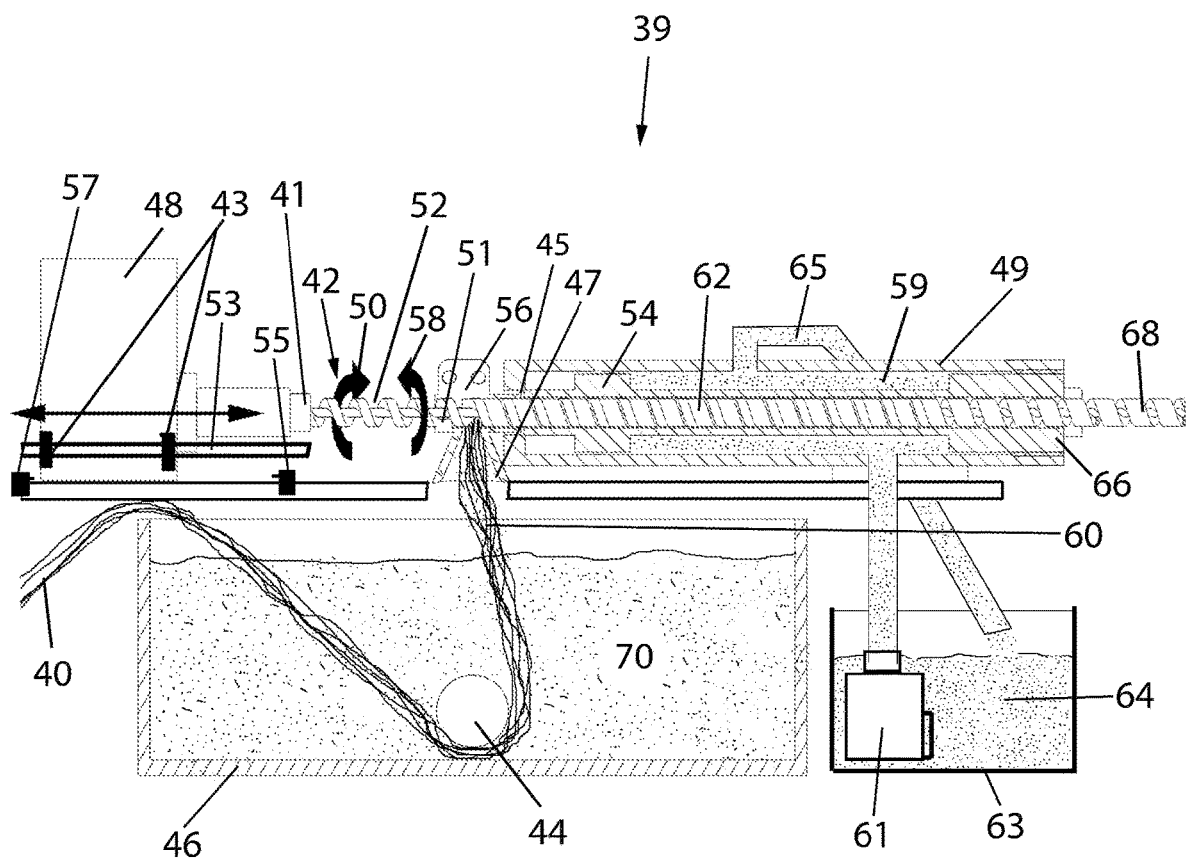
FIG. 5 illustrates an apparatus for production of helix shaped fire tinder for one described method.

The present disclosure is also directed to an exemplary but non-limiting example apparatus and process of manufacturing to create articles of manufacture of helix shaped fire tinder of the present disclosure. The accompanying illustration of FIG. 5 shows a cross-sectional view of an embodiment of a manufacturing apparatus 39 of the disclosure. It should be noted by the reader that the disclosed apparatus 39 and process of helix shaped fire tinder production should not be construed in any way to limit the scope of articles of manufacture, manufacturing apparatus, or manufacturing process afforded within the present disclosure and appended claims.

Referring to FIG. 5, the fire tinder manufacturing apparatus 39 has a temperature controlled heating tank 46 which serves as a wax heating container for melting and heating wax. The heating tank 46 heats and melts a provided wax based solution 70 and keeps it at a controlled temperature, in some embodiments being between 110° F. and 300° F. A loose flammable fiber yarn 40 of a desired weight is provided, the weight in some embodiments being between about 2 and 20 grams per yard (some particular embodiments being about 5 grams per yard). The provided flammable fiber yarn 40 is guided into the melted wax based solution 70 and under a submersion wheel 44 which is attached inside the heating tank 46 at the bottom. The submersion wheel 44 guides the loose flammable fiber yarn 40 down through the melted wax based solution. The resulting wax saturated fibers 60 are then guided up initially by hand through a guide orifice 47 in a coupler nut 56, and into an auger 42. The auger 42, defining a helix shaped auger cavity 52, works as a helix forming tool. The coupler nut 56 is attached to one end 45 of an auger tube 54. The auger 42, is mated with the coupler nut 56 with threads 51 in the coupler nut 56 and moves forward and backward through the coupler nut 56 with a forward spinning motion 50 and a backward spinning motion 58, the spin provided by an auger motor 48 (the spin RPM in some embodiments between 30 and 100 and in particular ones about 60 rpm) which is attached rigidly to the auger 42 at one auger end 41. The auger motor 48 slides forward and backward with the auger 42 on a slider rail 53 which is attached on either side of the motor with slide loops 43. The auger 42 and auger motor 48 are pulled forward and backward by the auger 42 spinning through the threads 51 of the coupler nut 56. The spin direction of the auger motor 48 is switched forward and backward by a forward limit switch 55 and a backward limit switch 57. As the auger 42 moves forward with the forward spinning motion 50 the wax saturated fibers 60 in the auger 42 are pulled further into the auger cavity 52 by the friction of the auger on the wax saturated fibers and into an auger tube 54. As the auger 42 continues to move forward into the auger tube 54 the wax saturated fibers 60 are compressed in the auger cavity 52 between the auger tube 54 and the auger 42 and become impregnated with the wax that saturates them. As the wax impregnated fibers 62 are being compressed they are also formed into the helix shape of the auger cavity 52 between the auger tube 54 and the auger 42 and are simultaneously cooled by the auger tube 54 as they continue to move into it. The auger tube 54 is cooled by a cooling liquid 64, in some embodiments being water, that circulates between the auger tube 54 and the auger tube housing 49. The auger tube 54 and auger tube housing 49 define a circulation cavity 59 between them, that allows room for the cooling liquid to circulate around the auger tube 54. The cooling liquid 64 circulates through a tube 65 and a liquid pump 61 sitting in a temperature control tank 63 to keep the cooling liquid 64 circulating at a desired temperature, the desired temperature in some embodiments being between about 60° F.-150° F. Once the auger motor 48 reaches a forward travel limit it bumps the forward limit switch 55 and the spin direction is reversed to the backward spinning motion 58. The backward spinning motion 58 of the auger 42 causes the auger 42 to back out of the auger tube 54 and the auger 42 twists out of the resulting cooled helix shaped wax impregnated fibers 68. Once the auger 42 has twisted out of the helix shaped wax impregnated fibers 68 and reaches a backward travel limit the backward limit switch 57 is triggered and the auger 42 moves in the forward spinning motion 50 again. The distance of the travel movement between the forward limit switch 55 to the backward limit switch 57 in some embodiments is between about 2 cm to 30 cm (some particular embodiments being around 10 cm). The forward spinning motion 50 loads fresh wax saturated fibers 60 into the auger 42 and the auger 42 pushes the previously formed helix shaped wax impregnated fibers 68 out of a far end 66 of the auger tube 54. The loading, compressing, cooling, and unloading process of the manufacturing apparatus 39 continues repeating over and over. As the cooled helix shaped wax impregnated fibers 68 unload from the far end 66 of the auger tube 54 they are cut off by hand with a sharp blade to a desired length creating completed helix shaped fire tinder articles. Augers of varying shapes and other helix forming tools of different shapes having some form of helix shaped cavity could be used to create different shapes and sizes of at least partially helix shaped fire tinder. The third fire tinder embodiment 84 of FIG. 3A, for example could be made with a corkscrew shaped tool in place of the auger. The wax based solution 70 includes at least one of a paraffin wax, a bees wax, a soy wax, a microcrystalline wax or a wax mix. A multitude of different additives such as colorants, texturizers, accelerants, scents, etc. can also be added to the wax based solution.

Figure 7:
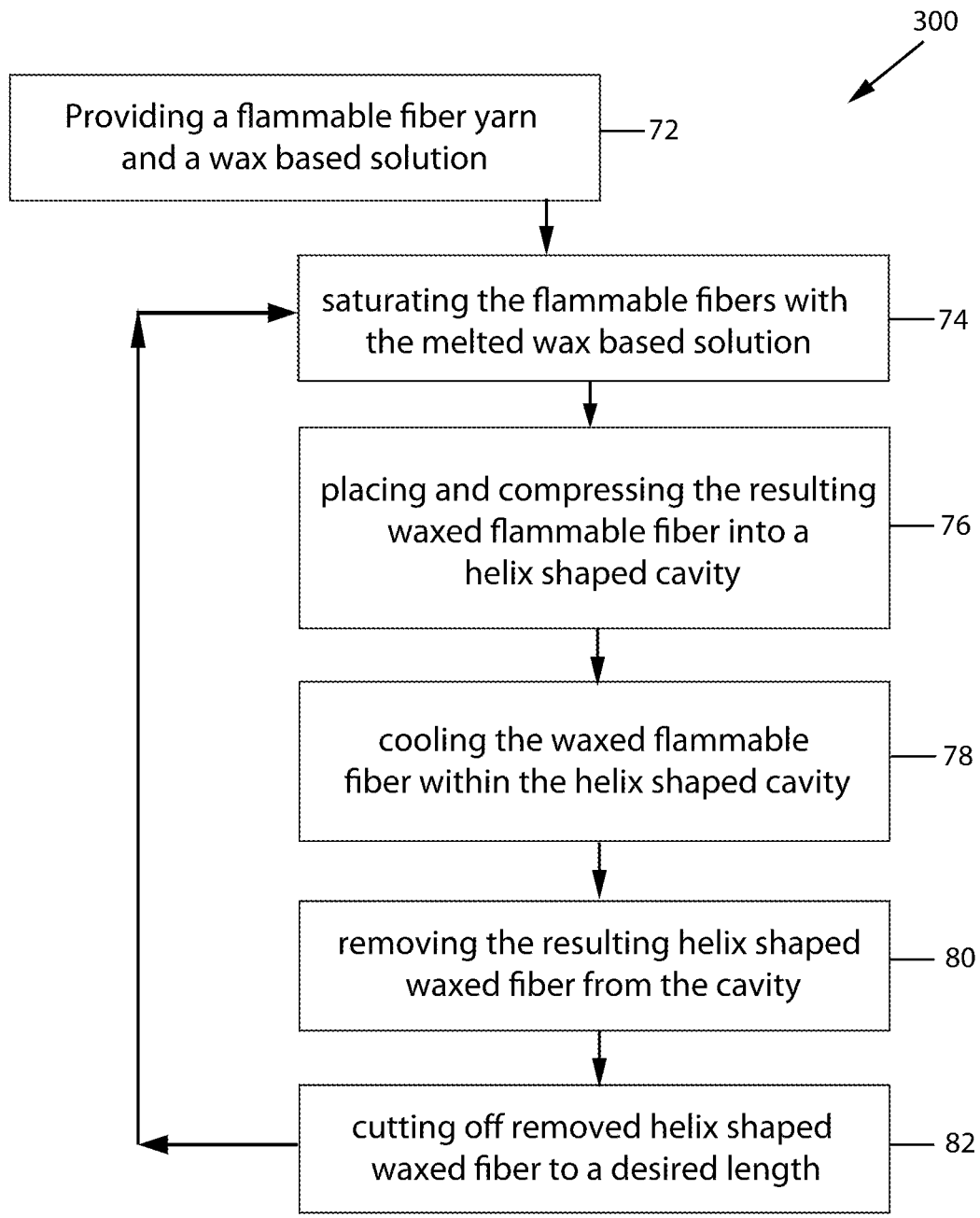
FIG. 7 illustrates a summarized flow diagram with steps for one described method of helix shaped fire tinder production.
Figure 8:
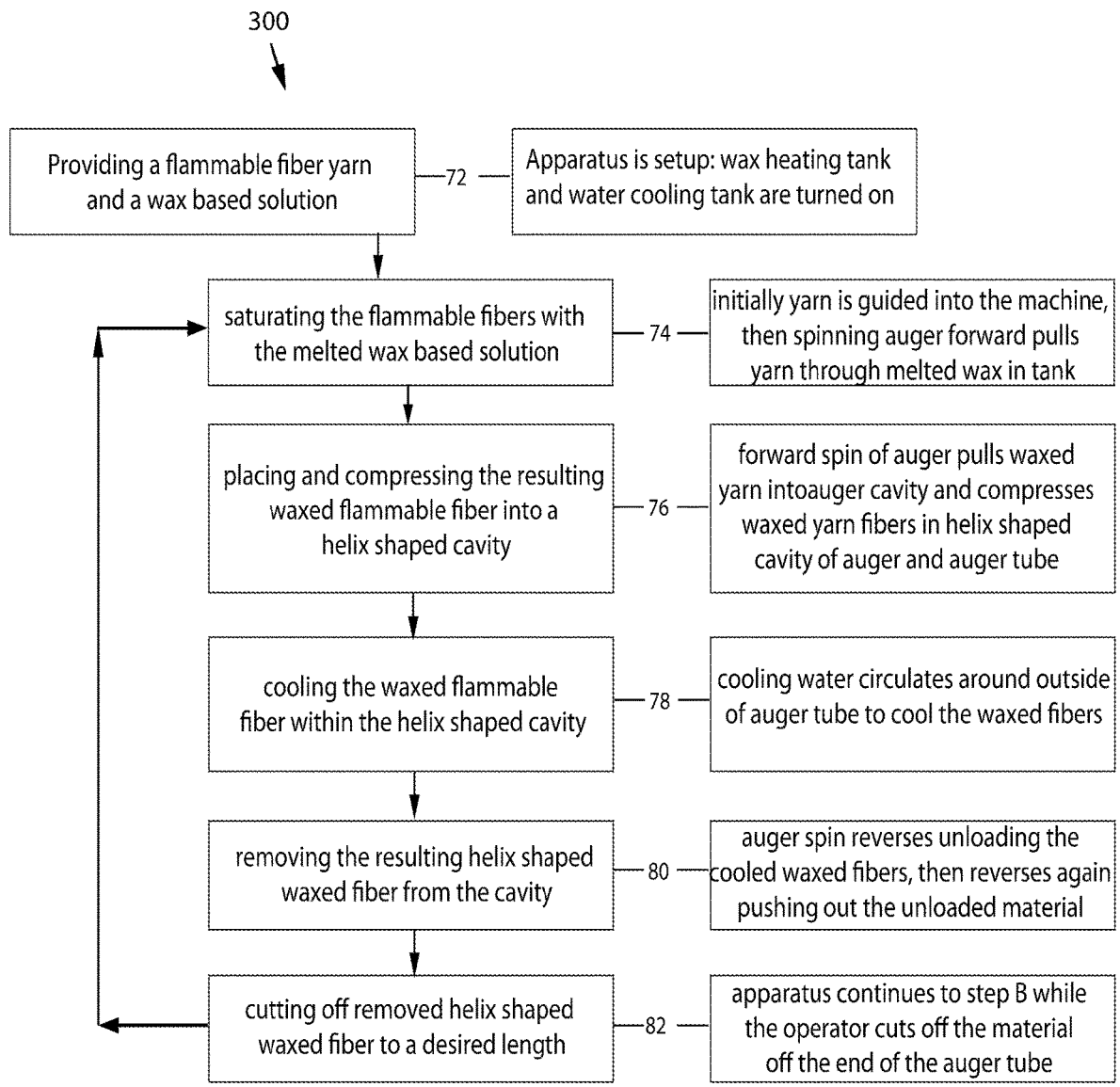
FIG. 8 illustrates a flow diagram with for the process of FIG. 7 with steps for one described method of helix shaped fire tinder as it relates to the described apparatus.

The following includes an exemplary but non-limiting process of fire tinder manufacture 300, other variations are possible but may not be listed. As the process is mainly carried out automatically, in accordance with some embodiments, such as the described apparatus 39 of FIG. 5 the description of the apparatus 39 can also be referred to for further process details. Referring to the general flow diagram of FIG. 7 and the expanded flow diagram of FIG. 8 (showing included workings of the apparatus 39 of FIG. 5), steps of the manufacturing process 300 include:

step A 72, providing a loose flammable fiber yarn and a wax based solution, loading them into a fire tinder manufacturing apparatus, setting up the apparatus for production including setting temperature controls of the apparatus and turning on the auger motor and guiding the loose flammable fiber yarn into the apparatus by hand;

step B 74, saturating the flammable yarn with the now melted wax based solution, spinning an auger of the manufacturing apparatus in a forward spinning motion, the action of the forward spinning motion pulling the loose flammable fiber yarn through the melted wax based solution in a hot wax heating tank;

step C 76, placing and compressing the resulting waxed flammable fiber into a helix shaped cavity, the continued forward spinning motion loading resulting wax saturated fibers into an auger cavity in the auger and into an auger tube, compressing the wax saturated fibers impregnating them with wax and forming them into the helix shape of the auger cavity; step D 78, cooling the shaped flammable wax impregnated fiber with the auger tube in the auger tube cavity, as the wax impregnated fibers are being compressed, cooled by a cooling liquid flowing around the auger tube;

step E 80, reversing the auger spin to a backward spinning motion, the action of the backward spinning motion pulling the auger out of the cooled helix shaped wax impregnated fiber and unloading it from the auger; reversing the auger spin again to a forward spinning motion, the forward spinning motion achieving the results of step B 74 and additionally unloading the previously cooled helix shaped wax impregnated fiber from the auger tube removing them from the apparatus to be cut off the auger tube end;

step F 82, cutting the cooled helix shaped wax impregnated fiber off of the end of the auger tube to a desirable length making the helix shaped fire tinder end product.

Control then moves back to step B 74 as shown by the arrows and then Steps B-F repeat over and over for continuous production.

Scope:

While particular process, usage, and physical embodiments have been illustrated and described, it would be obvious to those skilled in the art that various changes, subtractions, additions, or modifications may be made without departing from the spirit and scope of the invention. The appended claims therefore are intended to cover all such changes and modifications as being within the scope of this disclosure.

For example, some fire tinder embodiments that are envisioned within the scope of the present disclosure could be comprised of any type or mixes of flammable material(s), chemical(s), or wax based solution, or additives, or different coil pitches or helix shapes, or varying lengths or diameters allowing for accommodation in different sizes and configurations of host helix-shaped tools or tool members. Embodiments could be made with only a partial helix form.

Embodiments could be made to fill either part or all of a host tool or tool member. Helix shaped fire tinder can be designed and used as a stand-alone tinder or for use with other tools not described or as part of a kit. It is envisioned that a plurality of smaller tinder pieces could be made that when put together form at least a partially helix shape and/or integrate with a helix shaped tool or tool member.

It is envisioned that different auger shapes could be used to produce different helix shaped fire lighting tinder dimensions, pitches, and coil directions within the scope of the disclosure. It is envisioned that different temperatures and process parameters than described could be used to produce embodiments within the scope of the disclosure. It is envisioned that a cooling mold or other shaping tool, instead of an auger, could be used. It is envisioned that a helix shape could be made by coiling tinder into a helix shaped form before or during solidification.

It is envisioned that a helix shaped tinder could be used or stored in ways not described in the present disclosure.

These envisionments are stated not as limiting, but to help show the broadness of the scope of the present disclosure afforded under the appended claims and their equivalents.

CONCLUSIONS AND RAMIFICATIONS

Accordingly, the reader can see the many advantages for some embodiments that can be afforded by fire tinder with a helix shape, and fire tinder that is shaped and sized to integrate with a helix shaped tool, and the disclosed method of storage and process of manufacture. Although advantages are discussed, it is not intended that all embodiments have all advantages described. Some beneficial properties of the disclosed fire tinder, use, apparatus and method of production are summarized, though not all embodiments afforded under the scope of the disclosure and claims necessarily have each of these advantages or are limited to only these advantages. Helix shaped tinder affords many benefits over conventional shapes. The helical shape creates increased surface area and provides better air flow allowing for more reliable and consistent burn and added wind protection. A helix shape also allows for easy insertion and secure storage within a corkscrew and effectively utilizes the otherwise empty space. When inserted into a pocket tool corkscrew, such as a knife or multi-tool, the helix shaped fire tinder takes up no extra pocket space and requires no other container for storage that needs to be opened before use.

Integrating fire tinder with a helix-shaped tool adds functionality to that tool while eliminating the need to carry a separate loose fire tinder item that clanks around in the pocket and has more potential to get forgotten or lost. Many people already carry a pocket knife or multi-tool with a corkscrew wherever they go, adding tinder into the tool they already carry will make the helix shaped fire tinder much more likely to be readily available if the need for tinder arises. Carrying tinder in the corkscrew of a pocket tool allows for secure storage, rapid deployment and ease of use. A corkscrew sparking tool can integrate with the fire tinder within a corkscrew to provide means for the spark necessary to ignite the fire tinder into flame. The pairing of a helix shaped fire lighting tinder and a corkscrew sparking tool creates a complete waterproof fire starting system that can be integrated within a corkscrew.

The method of compressing waxed tinder into a helix shape causes the flammable tinder fibers to become impregnated with wax making them completely waterproof. When in the compressed helix shape the tinder is easily stored and not ignitable by accident until it is pulled apart by the user exposing fine fibers for lighting. The process of production describes an efficient way to produce fully waterproof and non-toxic fire tinder.

Advantages are further summarized in bullets:

allows for easy integration within host tool corkscrews of a multitude of different knife and multi-tool designs already in existence, effectively utilizing the otherwise empty space, providing a secure and safe storage for the fire tinder, and adding functionality to the host tool; a helical shape can create increased surface area and air flow during combustion allowing for more reliable and consistent burn;

a helix shape can provide added burn reliability in windy conditions;

integration inside an already carried pocket tool creates no extra pocket bulk and makes the tinder readily available and quick to deploy if needed;

the ability to integrate within another tool eliminates the need for adding another separate loose item to carry around and an additional container for storage is not required;

storing inside of a knife or multi-tool corkscrew means the user is more likely to remember to bring the tinder along with them so it is readily available if needed;

integrating within a host tool increases the likelihood that a device that can generate spark and manipulate the tinder for division into multiple pieces is also included as those devices can also be integrated within the tool;

process of production describes an efficient method to create fully waterproof and completely non-toxic helix shaped fire tinder.

I claim:

1. A fire tinder, comprising;
a body of the fire tinder, the body shaped and sized to be housed at least partially within at least one of, a helix-shaped tool, or a helix shaped tool member, the body defining an at least partially helix shape, the at least partially helix shape defining at least one or more voids between one or more turns of a helix along the direction of a central axis, the one or more turns defining at least one outer width, the at least one outer width matching or at least closely matching an outer width of at least one of the helix shaped tool or the helix shaped tool member, wherein the body is composed of at least one of flammable fibers or flammable particles, and at least a bonding material, the at least one of flammable fibers or flammable particles being at least partially held together into the at least partially helix shape with the bonding material.

2. The fire tinder of claim 1, wherein the body is shaped and sized to be housed fully within at least one of a helix-shaped tool or a tool with a helix shaped tool member.

3. The fire tinder of claim 1, wherein the body is shaped and sized to be housed substantially within a corkscrew of at least one of a pocket tool, a pocket knife, a multi-tool, or a wine opener.

4. The fire tinder of claim 1, wherein the at least partially helix shape defines an at least partially helix-shaped cavity.

5. The fire tinder of claim 1, wherein the at least partially helix shape includes a cross-sectional-plane-profile-shape, the cross-sectional-plane-profile-shape being at least one of rectangular or circular.

6. The fire tinder of claim 1, wherein the body is shaped and sized to be housed with a tool that houses with a corkscrew.

7. The fire tinder of claim 1, wherein the body is shaped and sized to be housed with a sparking tool.

8. A fire tinder, wherein the fire tinder is shaped and sized to be housed at least partially within a helix-shaped tool or helix-shaped tool member, the shape and size of the fire tinder including at least a helix shape, the helix shape defining at least one or more voids between one or more turns of a helix along the direction of a central axis, the one or more turns defining at least one helix pitch, the at least one helix pitch matching or at least closely matching a helix pitch of at least one of the helix-shaped tool or the helix-shaped tool member.

9. The fire tinder of claim 8, wherein the fire tinder is shaped and sized to also be housed with a tool that houses with a corkscrew.

* * * * *